United States Patent

Pohm et al.

[15] 3,703,713

[45] Nov. 21, 1972

[54] VARIABLE DIAMETER DISC PACK WITH COOPERATING HEAD

[72] Inventors: Arthur Pohm; Roy J. Zingg, both of Ames, Iowa

[73] Assignee: Iowa State University Research Foundation, Ames, Iowa

[22] Filed: Sept. 24, 1971

[21] Appl. No.: 183,474

[52] U.S. Cl........340/174.1 C, 179/100.2 A, 346/137

[51] Int. Cl...........................G11b 5/82, G11b 25/04

[58] Field of Search.........340/174.1 C; 179/100.2 A; 346/137; 274/10, 41.4

[56] References Cited

UNITED STATES PATENTS 3,229,269 1/1966 Namenyi-Katz....340/174.1 C 3,471,843 10/1969 Libman...............179/100.2 E 3,618,055 11/1971 Van Acker et al..340/174.1 F

*Primary Examiner*—Vincent P. Canney

*Attorney*—Dawson, Tilton, Fallon & Lungmus

[57] ABSTRACT

A large electronic memory system, designed to store up to $10^{12}$ bits, includes a large number of flexible discs coated with a magnetizable material for recording. The discs are arranged in groups, and each group includes a number of discs of increasing diameter. A thin read head is formed with a central slit that is designed to receive a disc selected to be read. The head is moved radially until its tapered distal end aligns vertically with the outer diameter of a disc desired to be selected. It is then moved vertically until the slit is aligned with the plane of the disc, and the head is then moved radially again, forcing adjacent discs away from the selected disc, until the read head is reading the desired track on that disc.

7 Claims, 6 Drawing Figures

Inventors:
Arthur V. Pohm
Roy J. Zingg
By Dawson, Tilton, Fallon & Lungmus
Atty's.

VARIABLE DIAMETER DISC PACK WITH COOPERATING HEAD

BACKGROUND OF THE INVENTION

1. Field of the Invention

The present invention relates to electronic memories; and more particularly, it relates to a rotating disc memory designed to store up to $10^{12}$ bits.

2. Known Systems

Rotating electronic memories are well-known; and they include magnetic drums as well as magnetic discs. In the first type mentioned, the drum has a generally cylindrical shape and its cylindrical side is covered with a magnetizable material, the recording tracks being arranged in parallel planes about the circumference of the drum.

Magnetic disc memories currently in commercial use employ a thin disc of aluminum which is coated with a magnetizable material, the memory tracks being arranged in a series of concentric circles centered about the center of the disc.

Although they do not now enjoy commercial acceptance, electronic memory systems have in the past employed flexible discs having one side coated with magnetizable material and driven by means of a shaft rotating about a vertical axis.

Disc memories of the type currently being used, then, do not use flexible discs as the recording medium. On the other hand, those systems known in the past employing flexible discs used only a single flexible disc for memory, and the cost of the memory per bit was therefore quite expensive.

There is a need today for very large memories, of the order of $10^{12}$ bits. These are sometimes referred to as archival memories.

SUMMARY

The present invention, then, is for a very large archival storage memory having a capacity of $10^{12}$ bits. The method of recording and reading on each individual disc may be according to conventional techniques. This invention particularly relates to an arrangement of a plurality of discs in a single, small location capable of recording the quantity of information desired.

One side of each of the discs is coated with a magnetizable material for recording, and the discs are arranged in groups. Each group includes a number of discs of increasing diameter, and they are arranged to rotate about a common axis. More than one group of discs may be driven by a common shaft.

When thus arranged, each disc, except for the smallest in a group, will extend beyond the outer circumference of an adjacent disc, the group of discs thus defining a step-like side view. A disc that is larger than an adjacent smaller disc will define a peripheral lip extending beyond the outer edge of the smaller disc.

A thin, knife-like read head is formed with a slit that receives a disc selected to be read. At its distal end, the side of the head below the slit protrudes slightly beyond the upper side of the head to form a contact point for disc selection. In selecting a disc, the head is extended radially until the contact point aligns vertically with the peripheral lip extension of the disc desired to be selected for reading. The read head is then moved vertically until the contact point of the head engages the peripheral lip of the selected disc, and the head is then moved radially inward of the disc again, separating adjacent discs, the selected disc being received in the slit. By adjusting the extension of the read head, any circumferential track on the selected disc may be read.

With the present invention, then, it is possible to store up to $10^{12}$ bits in a common location, and access to a particular track, although not as fast as in the case of a single disc, is, on the average faster than in the case of tapes or the like. Other features and advantages of the present invention will be apparent to persons skilled in the art from the following detailed description of the preferred embodiment accompanied by the attached drawing wherein identical reference numerals will refer to like parts in the various views.

THE DRAWING

DETAILED DESCRIPTION

Figures 1, 2, 3:
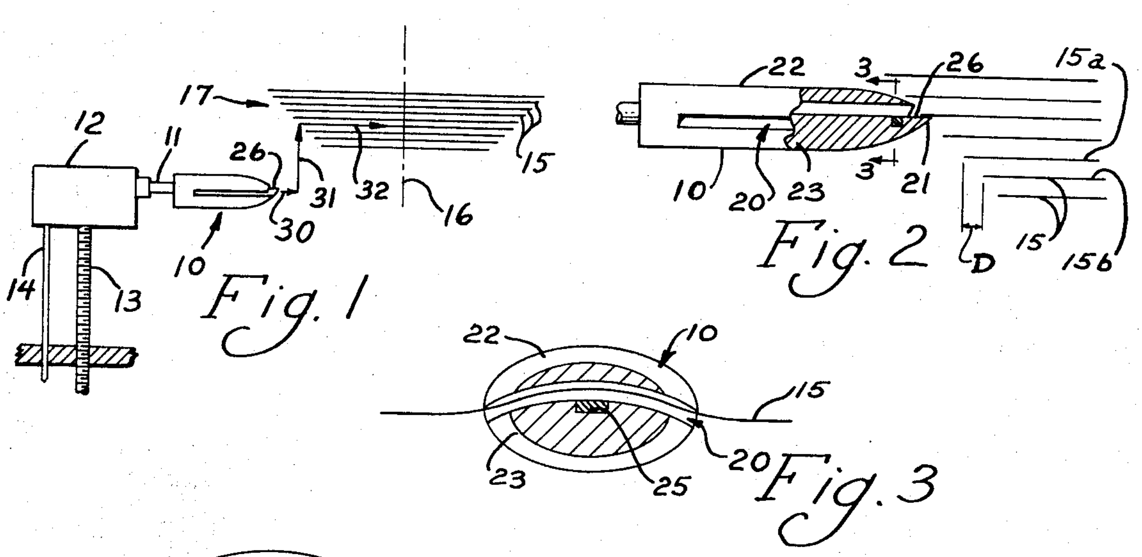
FIG. 1 is a diagrammatic view illustrating the motion of a read head in selecting a particular track.
FIG. 2 is a close up view illustrating one step in disc selection.
FIG. 3 is a cross sectional view taken through the sight line 3—3 of FIG. 2 illustrating the shape of the slit in the read head.

Turning then to FIG. 1, a read head is generally designated by reference numeral 10, and it is supported by an extendible arm 11 received within a housing 12. The housing 12 is mounted for vertical movement by means of a threaded shaft 13. Flexible wires extending from the housing 12 and connected to the read head 10 are shown diagrammatically at 14.

A plurality of individual flexible discs are designated by reference numeral 15, and they are mounted by any suitable means for rotation about a vertical axis illustrated by the chain line 16.

The discs 15 may be of a thin plastic material such as Mylar, coated with a conventional oxide coating known to be magnetizable. The thickness of the discs is preferably about 0.004 in.

As will be discussed later, it is preferred that the discs be arranged into a plurality of packs, each pack including eight groups of 16 discs. Each group of 16 discs occupies a one-inch vertical space on a common drive shaft, as will be explained presently. Turning then to FIGS. 1–2, there is shown a group generally designated by reference numeral 17, which, although not illustrated for purposes of clarity, contains 16 separate discs 15. The discs 15 within a given group have different circumferences or diameters, and they are arranged in order of increasing diameter from bottom to top. That is, the smallest disc is on the bottom, and discs of the next larger diameter are place in succession above it.

Turning particularly to FIG. 2, the separation of the discs 15 is exaggerated for clarity, as in the variation in diameters of the discs. However, referring to the two discs marked 15a and 15b respectively, it will be observed that the larger of the two discs, 15a defines a peripheral lip extending beyond the outer circumference of a smaller disc 15b. The width of this annular region is illustrated by the arrow D, and it forms a contact surface for the selection of the disc 15a. The read head 10 is split—that is, there is formed a central longitudinal slit in the head designated by reference numeral 20 and extending in a horizontal direction. The head has a thin, knife-like shape, being formed to a point 21 at the insertion or distal end. The slit 20 is adapted to receive a disc selected to be read, and it separates the head 10 into an upper section 22 and a lower section 23.

Referring now to FIG. 3, it will be observed that the slit 20 has an arcuate shape about a horizontal axis extending in the direction of extension of the head. This is so that a disc being read will have the proper aerodynamic shape for forming a suitable air bearing over a magnetic pickup 25 embedded in the lower section 23 of the head 20.

The magnetic pickup 25 may be of conventional design, including a slotted torroid of magnetic material upon which a current-carrying sense wire is wound. As the magnetized disc passes by the slot, the magnetic reluctance of the pickup changes, thereby changing the electrical impedance of the pickup. The impedance change, when reflected in changes in sense winding current, is thence representative of magnetization of the disc.

Referring again to FIG. 2, it will be seen that the tip 21 of the lower section 23 of the head extends beyond the tip of the upper section 22 of the head to define a contact surface 26 which will engage the peripheral lip extension of the disc selected in the manner illustrated in FIG. 2 when the head is moved in a vertical direction.

That is, referring to FIG. 1, selection of a disc is made by first extending the head 10 in a radial direction (relative to the axis of the threaded shaft 13) as indicated by the arrow 30, to a location at which the contact point 26 of the lower section 23 of the head is vertically aligned with the peripheral lip extension of the disc to be selected. Next, the shaft 13 is extended upwardly until the contact point 26 engages the lip extension of the disc desired to be read. This motion is diagrammatically illustrated by the vertical arrow 31 in FIG. 1. Finally, with the disc desired to be read is aligned with the open end of the slot 20 and guided by the arcuate contact surface 26, the read head is moved again radially, as indicated by the arrow 32 until the magnetic pickup 25 is located adjacent the particular track of the selected disc that is desired to be read.

As the head is moved radially inward of the group of discs, so that the selected disc is received within the slot 20 of the head, the converging tip of the knife-shaped head pushes adjacent discs (both upper and lower) aside; and as the discs rotate, these adjacent discs pass respectively above and beneath the head. Further, as has been mentioned, the transverse curvature of the slot 20 in the head 10 is designed as a function of the rigidity of the disc 15, the speed at which it travels, etc. so as to provide an air cushion which acts as a bearing as the disc 15 passes through the slot 20, thus maintaining a uniform distance between the oxide-coated lower surface of the disc 15 and the magnetic pickup 25.

Figure 4:
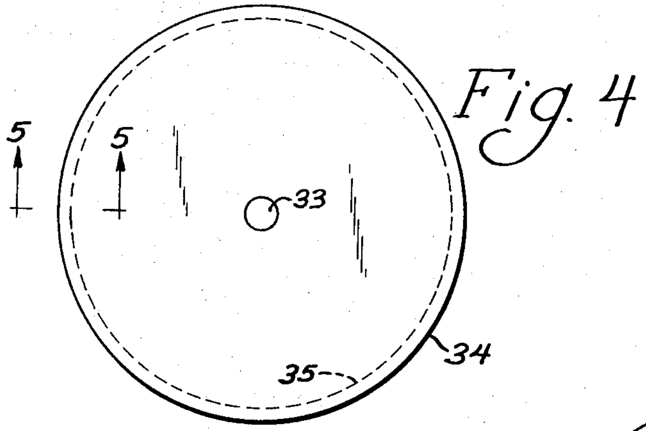
FIG. 4 is a plan view illustrating the range of diameters for discs of a single pack.

Turning now to FIG. 4, there is seen one group of discs in diagrammatic plane form, all of which are mounted to a common shaft designated by reference numeral 33 which is driven in constant angular rotation by any suitable means.

Figure 5:
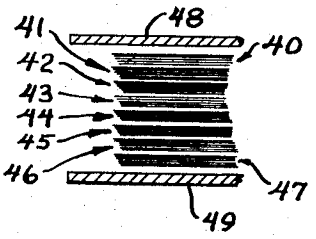
FIG. 5 is a vertical cross sectional view taken through the sight line 5—5 of FIG. 4.

The periphery of the largest disc (the uppermost one in the illustrated embodiment) is diagrammatically illustrated by the solid line 34; whereas the outer periphery of the smallest disc in a group is indicated by the dashed circle 35. An appropriate outer diameter for the largest of a group of discs is preferably in a range of 14–15 in. The discs are arranged in packs consisting of eight groups of 16 discs. These eight groups occupy only one inch in a column vertically. One such pack is illustrated in FIG. 5, the eight separate groups of 16 sheets being generally represented by reference numerals 40-47 respectively. Each pack includes an upper and a lower plate having a thickness of 1/16 in., and these are designated respectively 48 and 49 for the pack illustrated in FIG. 5.

Figure 6:
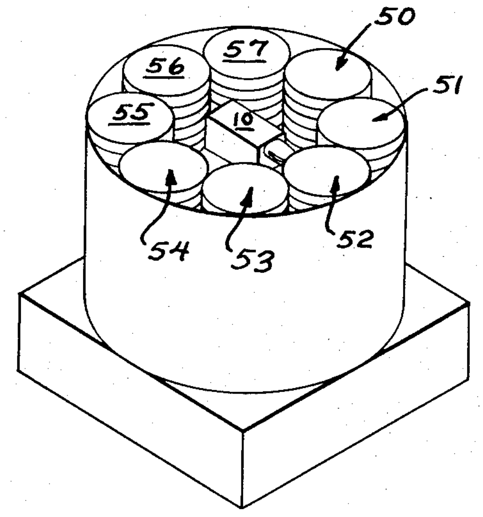
FIG. 6 is a diagrammatic view of a system incorporating a plurality of packs and for providing an archival type of electronic memory system.

Thirty-two of these packs are arranged in a 48 in. cylindrical shaped roll sometimes referred to as a rack. The individual packs in a rack are separated by ½ in. spacings for bearings between each pack. Eight of these cylindrical rolls are placed in a circular arrangement as illustrated in FIG. 6, the eight cylindrical rolls being designated respectively 50–57. The read head is located in the center of racks 50–57, with the axis of rotation of the head 10 being located at the center of a circle circumscribed by axes of rotation of the racks 50–57.

In selecting a particular disc, first a cylindrical roll is selected, then a particular pack and group is selected, then an individual sheet, followed by a track on the sheet, and finally a sector on the track. It is contemplated that individual packs could be removed and stored while replaced, if desired.

The individual tracks on a disc could be arranged either to have widths of five mils so that there would be 400 tracks on a disc with a density of 2500 bits per inch, or the tracks could have a width of 8 mils, and the bit density raised to 4000 bits per inch. In either case, each disc would have a storage capacity of the order of $4\times10^7$ bits per disc. Since there are eight groups of 16 per pack, there are $5\times10^9$ bits per pack. With 32 packs per rack, there are $1.6\times10^{11}$ bits per rack, and since there are eight racks, there are $1.28\times10^{12}$ bits in the whole memory.

The present invention, therefore, includes an arrangement of discs providing a flexible storage medium into a plurality of groups with individual discs in a group having graduated diameters, whereby the larger of two adjacent discs has a peripheral lip extending beyond the outer circumference of a smaller adjacent disc. This peripheral area provides a contact location for a correspondingly notched or offset split read head. The read head is brought into contact with a selected disc vertically, and then moved radially inward of the disc to read a predetermined or selected track on the disc. Although in the illustrated embodiment of FIG. 6, a single head is used to read all of the discs in the memory, persons skilled in the art will appreciate that more than one read head may be employed.

We have no preferred mechanism for driving the magnetic head either in elevation, in extension, or angularly, as is in the case in the embodiment of FIG. 6.

There are available any number of suitable drive mechanisms for these purposes, either the threaded shaft shown or the use of conventional linear motors. Stepping motors may be used in extending the head to the desired vertical alignment with a disc to be selected if desired.

Further, as persons skilled in the art will appreciate, there is no preferred method of recording information on the discs as any number of well-known methods of recording currently in use would work equally well. If it is desired to use a method of recording employing a clock track, a separate head could be used for reading the clock track or a separate clock track disc could be incorporated into each pack. Similarly, a clock track pick-up could be used with a separately recorded clock track on each disc if each disc is to have a plurality of tracks on it. Still another alternative is to use any of a number of known recording techniques which require no separate timing track, for example, adding a parity bit at predetermined locations along each track. There are other known methods of recording which are self-clocking and require no separate timing track.

Having thus described in detail a preferred embodiment of the invention, persons skilled in the art will be able to modify certain of the structure which has been illustrated and to substitute equivalent elements for those which have been disclosed while continuing to practice the inventive principles; and it is, therefore, intended that all such modifications and substitutions be covered as they are embraced into the spirit and scope of the appended claims.

We claim:

1. A memory system comprising: a plurality of flexible discs adapted to magnetically record electronic signals, said discs being mounted on a common shaft, each of said discs being of a different diameter than the others, and said discs being arranged in order of increasing diameter; and read means including a movable read head defining a distal end, said head being movable radially of said plurality of discs until said distal end aligns vertically with the periphery of a disc selected to be read, said head means thence being movable vertically until said head is aligned with the plane of said selected disc, said head then being movable radially inward of said selected disc to select a track thereon.

2. The system of claim 1 wherein said read head has a thin, knife-like shape, converging to a point at the distal end thereof and defining a longitudinal slit extending from said converging point for receiving a selected disc.

3. The system of claim 2 wherein each disc of larger diameter relative to an adjacent disc of smaller diameter provides a peripheral lip extension beyond the outer circumference of said smaller disc, and wherein said head is divided into two sections by said longitudinal slit, the distal end of one of said sections terminating short of the other while conforming to the convergence thereof to thereby define a contact surface adapted to engage the peripheral lip extension of a disc during the vertical selection motion of said head.

4. In a memory system adapted for archival storage of large quantities of digital data, the combination comprising a plurality of groups of flexible recording discs, each group comprising a plurality of discs having varying outer circumferences and being arranged in order of increasing circumference from bottom to top, whereby each disc defines a peripheral lip extension relative to a lower disc, said lip extension being adapted to engage a corresponding contact surface on a vertically movable read head, whereby a desired disc may be isolated from adjacent discs.

5. The system of claim 4 further comprising a narrow read head including a longitudinal slit arcuate in transverse section for receiving an associated disc and for forcing adjacent discs away from said selected disc when said head is moved radially thereof.

6. In a memory system for archival storage of large quantities of digital electronic data; the combination comprising a plurality of vertically-stacked packs of flexible discs adapted for the magnetic storage of signals, said discs being mounted on a common axis for rotation therewith; each stack being arranged into a plurality of groups of discs, adjacent stacks being separated by plates extending transverse of the shaft; each individual group of discs comprising a plurality of discs of different diameters and arranged in order of increasing diameter; and a movable head having a generally converging distal end and defining an elongated slit with an arcuate cross-sectional shape, said head being movable vertically to register with a selected group of discs, thence being movable radially inward of said discs until its distal end aligns with an overhanging peripheral lip of the disc selected to be read; said head thence being movable vertically to engage the selected disc and thence being movable radially inward to receive the selected disc within said elongated slit; said head further including magnetic pick-off means for reading the digital information stored magnetically on the selected disc.

7. A method of selecting stored information including providing a plurality of flexible magnetic discs of different diameters; arranging said discs in order of increasing diameter; rotating said discs about a common axis; moving a read head radially of said axis of rotation until its distal end aligns vertically with the periphery of a disc desired to be selected; then moving said head vertically until it aligns with the plane of the selected disc; and then moving said head radially inward of said axis to assume a read position while separating said selected disc from adjacent discs with said head.

* * * * *